(12) United States Patent
Simons et al.

(10) Patent No.: US 8,701,635 B2
(45) Date of Patent: Apr. 22, 2014

(54) SUPERCHARGER SYSTEM FOR MOTORIZED VEHICLES AND RELATED TRANSPORTATION

(76) Inventors: Robert Simons, Irvine, CA (US); Chad Magana, Lakewood, CA (US)

(*) Notice: Subject to any disclaimer, the term of this patent is extended or adjusted under 35 U.S.C. 154(b) by 585 days.

(21) Appl. No.: 12/611,846

(22) Filed: Nov. 3, 2009

(65) Prior Publication Data

US 2010/0108040 A1 May 6, 2010

Related U.S. Application Data

(60) Provisional application No. 61/110,893, filed on Nov. 3, 2008.

(51) Int. Cl.
*F02B 33/00* (2006.01)
*F02M 35/00* (2006.01)
*F01C 11/00* (2006.01)
*F02B 33/38* (2006.01)
*F04C 18/16* (2006.01)
*F04C 18/08* (2006.01)
*F04C 18/12* (2006.01)
*F02M 35/10* (2006.01)

(52) U.S. Cl.
CPC .............. *F01C 11/008* (2013.01); *F02B 33/38* (2013.01); *F04C 18/16* (2013.01); *F04C 18/084* (2013.01); *F04C 18/126* (2013.01); *F04C 2250/101* (2013.01); *F02M 35/10072* (2013.01); *F02M 35/10157* (2013.01); *F02M 35/10131* (2013.01); *Y02T 10/144* (2013.01)
USPC .............. 123/559.1; 123/184.57; 123/184.61; 123/184.34

(58) Field of Classification Search
CPC ........ F01C 11/008; F02B 33/38; F04C 18/16; F04C 18/084; F04C 18/126; F04C 2250/101; F02M 35/10072; F02M 35/10157; F02M 35/10131; Y02T 10/144
USPC ................. 123/559.1–559.3, 184.57, 184.61, 123/184.32, 184.35, 184.36; 418/157, 196, 418/20, 6.1, 206.5, 201.1, 206.1; 74/488, 74/606 A
See application file for complete search history.

(56) References Cited

U.S. PATENT DOCUMENTS

| | | | | |
|---|---|---|---|---|
| 3,303,832 | A * | 2/1967 | Platner et al. ............ | 123/184.32 |
| 4,028,892 | A | 6/1977 | Hinkle ............................ | 60/599 |
| 4,140,280 | A * | 2/1979 | Allen et al. ................ | 74/606 A |
| 4,440,120 | A * | 4/1984 | Butler ........................ | 123/184.34 |
| 4,513,698 | A * | 4/1985 | Senga et al. ............. | 123/184.36 |
| 4,615,324 | A * | 10/1986 | Choushi et al. .......... | 123/184.36 |
| 4,649,871 | A * | 3/1987 | Hatamura et al. ....... | 123/184.35 |
| 4,741,295 | A * | 5/1988 | Hosoya et al. ........... | 123/184.31 |
| 4,858,496 | A * | 8/1989 | Iwatsuki et al. ................ | 477/33 |
| 4,899,799 | A * | 2/1990 | Drazy ............................. | 164/34 |

(Continued)

FOREIGN PATENT DOCUMENTS

| | | | | |
|---|---|---|---|---|
| DE | 102009051030 A1 * | 5/2011 | ............. | F02B 33/36 |
| JP | 2003097278 A * | 4/2003 | ............. | F02B 29/04 |

*Primary Examiner* — Thai Ba Trieu
(74) *Attorney, Agent, or Firm* — Buchalter Nemer; Sandra Poteat Thompson

(57) ABSTRACT

A supercharger system is disclosed herein having a front end, a rear end, an inlet and an outlet, the system contained within a housing, wherein the supercharger system includes a rotor assembly, and a plurality of intake runners that comprise an interlaced cross-runner pattern, wherein the supercharger system comprises a front drive, front inlet configuration and an inverted orientation.

19 Claims, 3 Drawing Sheets

(56) References Cited

U.S. PATENT DOCUMENTS

| | | | |
|---|---|---|---|
| 4,910,959 A * | 3/1990 | Dones | 123/559.2 |
| 5,127,371 A * | 7/1992 | Ogawa et al. | 123/184.34 |
| 5,797,735 A * | 8/1998 | Ishikawa et al. | 418/206.1 |
| 5,911,211 A | 6/1999 | Uchida | 123/559.1 |
| 6,029,637 A * | 2/2000 | Prior | 123/559.1 |
| 6,318,490 B1 * | 11/2001 | Laning | 74/488 |
| 6,604,514 B1 * | 8/2003 | Englund et al. | 123/559.1 |
| 6,679,215 B2 * | 1/2004 | Benson et al. | 123/184.61 |
| 6,837,195 B2 * | 1/2005 | Suwazono | 123/559.1 |
| 7,011,079 B2 * | 3/2006 | Park | 123/559.1 |
| 7,059,289 B2 * | 6/2006 | Cunningham et al. | 123/184.61 |
| 7,370,620 B1 * | 5/2008 | Nino et al. | 123/184.32 |
| 7,426,921 B2 * | 9/2008 | Billings et al. | 123/559.1 |
| 7,488,164 B2 * | 2/2009 | Swartzlander | 418/196 |
| 7,604,467 B2 * | 10/2009 | Prior | 418/201.1 |
| 7,607,958 B1 * | 10/2009 | Hochmayr et al. | 440/75 |
| 7,669,586 B2 * | 3/2010 | Prior | 123/559.1 |
| 7,694,667 B2 * | 4/2010 | Williams et al. | 123/559.1 |
| 7,866,966 B2 * | 1/2011 | Swartzlander | 418/206.5 |
| 2001/0022167 A1 * | 9/2001 | Brassell et al. | 123/184.61 |
| 2003/0079707 A1 * | 5/2003 | Brassell et al. | 123/184.61 |
| 2003/0101957 A1 * | 6/2003 | Benson et al. | 123/184.57 |
| 2007/0175456 A1 | 8/2007 | Tally | 123/559.1 |
| 2008/0135010 A1 | 6/2008 | Prior | 123/184.57 |
| 2009/0081402 A1 * | 3/2009 | Tomoda et al. | 428/66.1 |
| 2011/0058974 A1 * | 3/2011 | Swartzlander | 418/201.1 |
| 2011/0088667 A1 * | 4/2011 | Bell et al. | 123/559.2 |
| 2011/0150671 A1 * | 6/2011 | Ouwenga | 418/206.1 |
| 2012/0020824 A1 * | 1/2012 | Huang et al. | 418/157 |

* cited by examiner ism or a combination thereof, and e) the super-
SUPERCHARGER SYSTEM FOR MOTORIZED VEHICLES AND RELATED TRANSPORTATION This United States Utility Application claims priority to U.S. Provisional Application Ser. No. 61/110,893 filed on Nov. 3, 2008, which is commonly-owned and incorporated herein by reference in its entirety.

FIELD OF THE SUBJECT MATTER

The field of the subject matter is supercharger systems for motorized vehicles and related transportation.

BACKGROUND

Vehicle enthusiasts are always looking for new devices and materials to improve the performance and power of the vehicle. One of these engine adaptations is the addition of a supercharger or turbocharger. Engine response and power is increases by pressurizing the intake air entering the cylinders of the vehicle. Some of the difficulties in adding superchargers to existing engines are that they don't efficiently and smoothly direct air in and out of the supercharger, they don't incorporate well within the confines of an unmodified engine compartment, and they don't work to minimize temperature increase and power consumption, which can lead to parasitic power loss. One significant disadvantage is that supercharger power is taken from the engine crankshaft, which reduces the engine output and harms fuel consumption.

In some supercharger installations, the original hood of the car must be replaced by a larger hood in order to accommodate the addition of the supercharger. In addition, many, if not all, conventional supercharger systems are designed such that they decrease the efficiency of the vehicle or don't operate at maximum potential, because of restrictive air inlet and outlet plumbing, along with cooling issues.

Therefore, it would be ideal to provide a new supercharger system that: a) is easily and compactly incorporated into a standard vehicle without the need to reconfigure the hood, b) provides improved airflow at lower pressures and temperatures than existing or conventional supercharger designs, c) allows the vehicle to be more fuel efficient than conventional supercharger systems, and d) meets all CARB emissions requirements or a combination thereof, and e) the supercharger system housing is integrated into the same housing as the intake manifold of the engine.

SUMMARY

A supercharger system is disclosed herein having a front end, a rear end, an inlet and an outlet, the system contained within a housing, wherein the supercharger system includes a rotor assembly, and a plurality of intake runners that comprise an interlaced cross-runner pattern, wherein the supercharger system comprises a front drive, front inlet configuration and an inverted orientation.

DETAILED DESCRIPTION

A new supercharger system has been developed that: a) is easily and compactly incorporated into a standard vehicle without the need to reconfigure the hood, b) provides improved airflow at lower pressures and temperatures than existing or conventional supercharger designs, c) allows the vehicle to be more fuel efficient than conventional supercharger systems, and d) meets all CARB emissions requirements or a combination thereof, and e) the supercharger system housing is integrated into the same housing as the intake manifold of the engine. In some embodiments, the standard amount of supercharging power can be provided with at least 25% less boost than a conventional supercharger. And in other embodiments, the standard amount of supercharging power can be provided with at least 50% less boost than a conventional supercharger. Contemplated supercharger systems may be used in any suitable vehicle, including GM® and Ford® vehicles. Specifically, contemplated supercharger systems may be utilized in a Corvette® or Mustang®.

Specifically, a supercharger system is disclosed herein having a front end, a rear end, an inlet and an outlet, the system contained within a housing, wherein the supercharger system includes a rotor assembly, and a plurality of intake runners that comprise an interlaced cross-runner pattern, wherein the supercharger system comprises a front drive, front inlet configuration and an inverted orientation after installation and during operation. In some embodiments, contemplated supercharger systems may comprise an electric throttle body, an integrated bypass valve, an intercooler system or a combination thereof.

Figure 1:
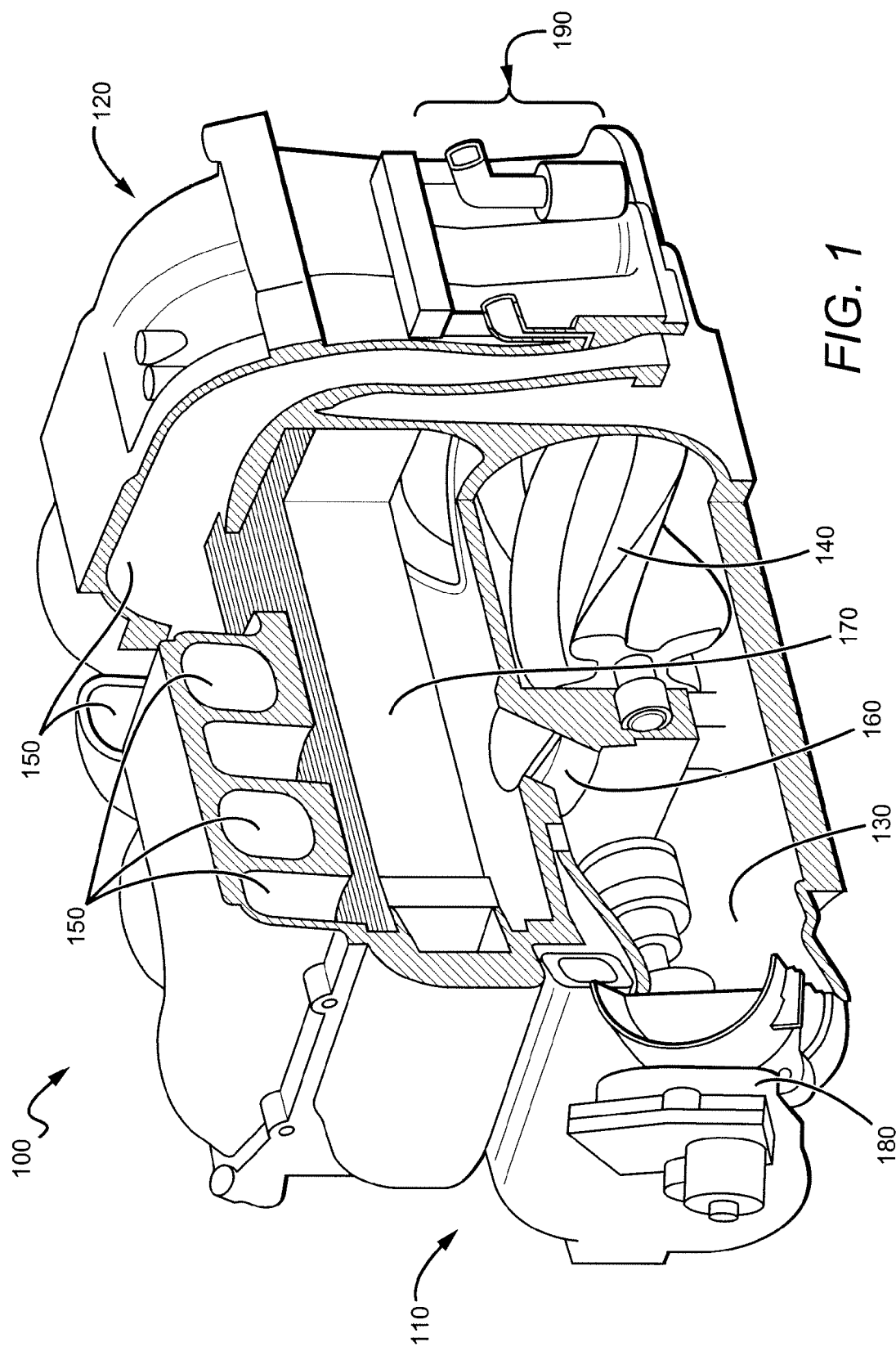
FIG. 1 shows a contemplated supercharger system 100 wherein a portion of the housing has been sliced off to show the internal features, wherein the supercharger system 100 comprises a front end 110, a rear end 120, an ultra low restriction inlet tube 130 and an outlet (not shown).

FIG. 1 shows a contemplated supercharger system 100 wherein a portion of the housing has been sliced off to show the internal features, wherein the supercharger system 100 comprises a front end 110, a rear end 120, an ultra low restriction inlet tube 130 and an outlet (not shown). This contemplated supercharger system 100 also comprises a rotor assembly (not shown in full) that comprises two rotors 140—one of which is shown, and a plurality of intake runners 150 that comprise an interlaced cross-runner pattern. This particular embodiment also comprises an integrated bypass valve 160, an intercooler system 170 and an electric throttle body 180. Fuel injectors 190 are also shown on this embodiment.

Figure 2:
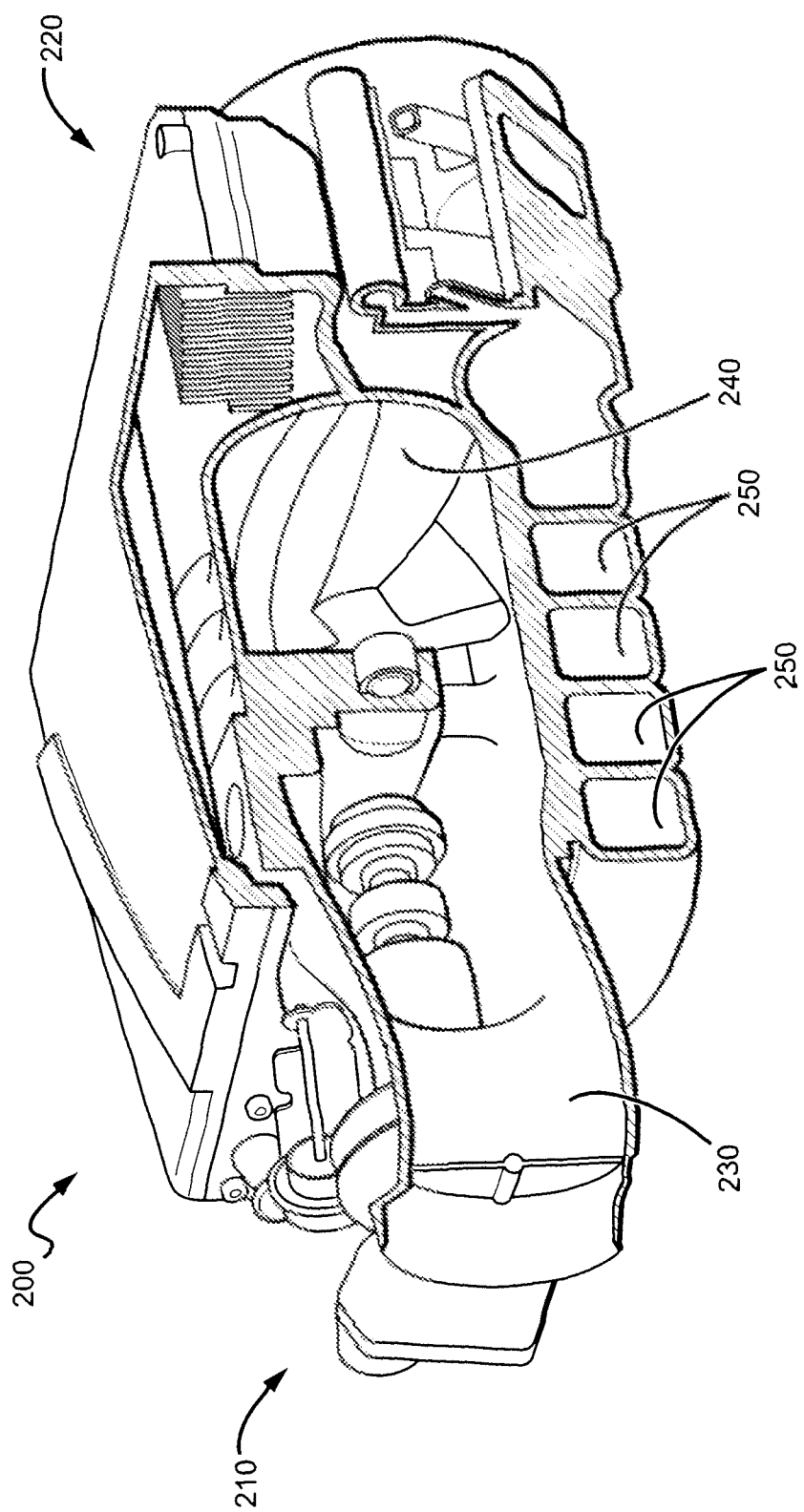
FIG. 2 shows a contemplated supercharger system 200 wherein a portion of the housing has been sliced off to show the internal features, wherein the supercharger system 200 comprises a front end 210, a rear end 220, an ultra low restriction inlet tube 230 and an outlet (not shown), and wherein the supercharger system 200 is in an inverted configuration.

FIG. 2 shows a contemplated supercharger system 200 wherein a portion of the housing has been sliced off to show the internal features, wherein the supercharger system 200 comprises a front end 210, a rear end 220, an ultra low restriction inlet tube 230 and an outlet (not shown), and wherein the supercharger system 200 is in an inverted configuration. This contemplated supercharger system 200 also comprises a rotor assembly (not shown in full) that comprises two rotors 240—one of which is shown, and a plurality of intake runners 250 that comprise an interlaced cross-runner pattern.

As mentioned, a contemplated supercharger system comprises a housing or housing assembly, wherein the supercharger system and/or the housing has a front end, a rear end, an inlet and an outlet. The front end of the housing is oriented toward the front end of the car after assembly. The rear end of the housing is oriented toward the passenger compartment of the vehicle after assembly. In some embodiments, the housing or housing assembly is integrated into the same housing as the intake manifold. As also mentioned, a contemplated supercharger system comprises an inverted configuration. As used herein, the phrase "inverted configuration" means that the outlet of the supercharger system points upward, away from the engine crankshaft.

A contemplated supercharger system comprises a rotor assembly that comprises at least one rotor and in some embodiments, two or more rotors. Also, in contemplated embodiments, the rotors are installed from the rear of the housing as in a rear drive, front inlet setup; however, instead of using a jack shaft to drive the supercharger from the rear, a front drive setup is utilized and coupled to the end of the rotor shaft for a reliable and elegant setup, which combines a short, straight inlet path of a front inlet configuration with a reliable and compact front drive method.

This type of supercharger system design is novel over conventional superchargers for several reasons. In conventional superchargers, such as axial flow, positive displacement superchargers, they are arranged in one of two ways: front drive, rear inlet or rear drive, front inlet. Each conventional design has its drawbacks. With the rear inlet design, the air must be routed from the filter box at the front of the car all the way back to the rear of the supercharger, which is a very long path having lots of bends. That design is quite restrictive and can lead to higher temperatures and lower efficiency. The supercharger is driven off of the crank pulley at the front of the engine. Rear drive requires the use of a jack shaft and auxiliary drive belt at the back of the supercharger. These systems are notorious for failures.

As mentioned, contemplated supercharger systems comprise a suitable rotor assembly, such as an Eaton® Twin Vortices Series (TVS®) GEN VI rotor assembly. Some contemplated rotor assemblies, such as those mentioned above, comprise at least one rotor, and in some embodiments, at least two rotors wherein each rotor comprises at least one lobe, and in some embodiments, at least two lobes. In some embodiments, each contemplated rotor may comprise at least three lobes, and in other embodiments, each contemplated rotor may comprise at least four lobes. Some contemplated rotor assemblies may comprise rotors where each rotor has a different number of lobes than the other rotor. For example, in one rotor assembly, one rotor may comprise three lobes and the other rotor may comprise five lobes.

In some embodiments, contemplated rotors comprise a four-lobe configuration, wherein each lobe comprises a full 160° twist. The twist on the rotors may comprise any suitable angle, however, and should be at least 60°. In some embodiments, the twist on the rotors is at least 100°. In other embodiments, the twist on the rotors is at least 120°. In yet other embodiments, the twist on the rotors is at least 140°. These different types of rotor designs advantageously improve both volumetric and thermal efficiency over conventional systems, which mean that with each rotation, the maximum airflow is achieved with the minimum work from the engine and a minimum temperature rise in contemplated supercharger systems. In some contemplated supercharger systems, suitable rotors and rotor assemblies should also operate much more quietly than conventional rotor assemblies.

Another feature of some contemplated supercharger systems is that they comprise an integrated bypass valve. The bypass valve is a vacuum-actuated throttle plate that divides the inlet and outlet plenum of the supercharger. Under normal driving conditions when horse power demand is low, the valve is held open by manifold vacuum. This open valve equalizes the pressure before and after the supercharger rotors minimizing any parasitic power loss associated with pumping air. That means that as long as the valve is open the engine would not use any more fuel that it would if the supercharger were not installed. When one steps on the accelerator pedal, and the throttle body opens, the manifold will lose vacuum and the bypass will close, which allows all intake air to pass through the supercharger rotors and for positive boost pressure to build up in the plenum. What makes a contemplated integrated bypass valve unique is its integration into the supercharger housing. Many conventional kits use external bypass valves that utilize couplers or gaskets that can leak leading to dangerous running conditions over time.

Once air exits a contemplated supercharger system's rotors and/or rotor assembly, it is pressurized in the plenum and then passes through a relatively large intercooler. Coolant, such as cool water, flowing through the intercooler core absorbs heat from the pressurized air, which effectively increases the density of the air and reduces the volatility of the fuel/air charge entering the combustion chamber—both resulting in increased horsepower.

Most conventional aftermarket supercharger kits contain a stock forward throttle body that is restrictive and requires the supercharger to work harder in order to achieve a certain amount of air flow. In some embodiments, as disclosed above, a contemplated supercharger system comprises an oversized electric throttle, which in some embodiments is at least 85 mm in diameter. A contemplated electric throttle is built to OEM standards with a 356 T6 cast aluminum housing, brass throttle blade and injection molded gearing, which may be made from glass-filled Nylon®. Other aftermarket throttle bodies use machined gears which are known to bind and cause dangerous stopped throttle conditions. Contemplated injection molded gears are made to the same standards, materials, dimensional specifications and tolerances as the factory vehicle, such as a factory Ford®, ensuring safe, reliable operation.

Figure 3:
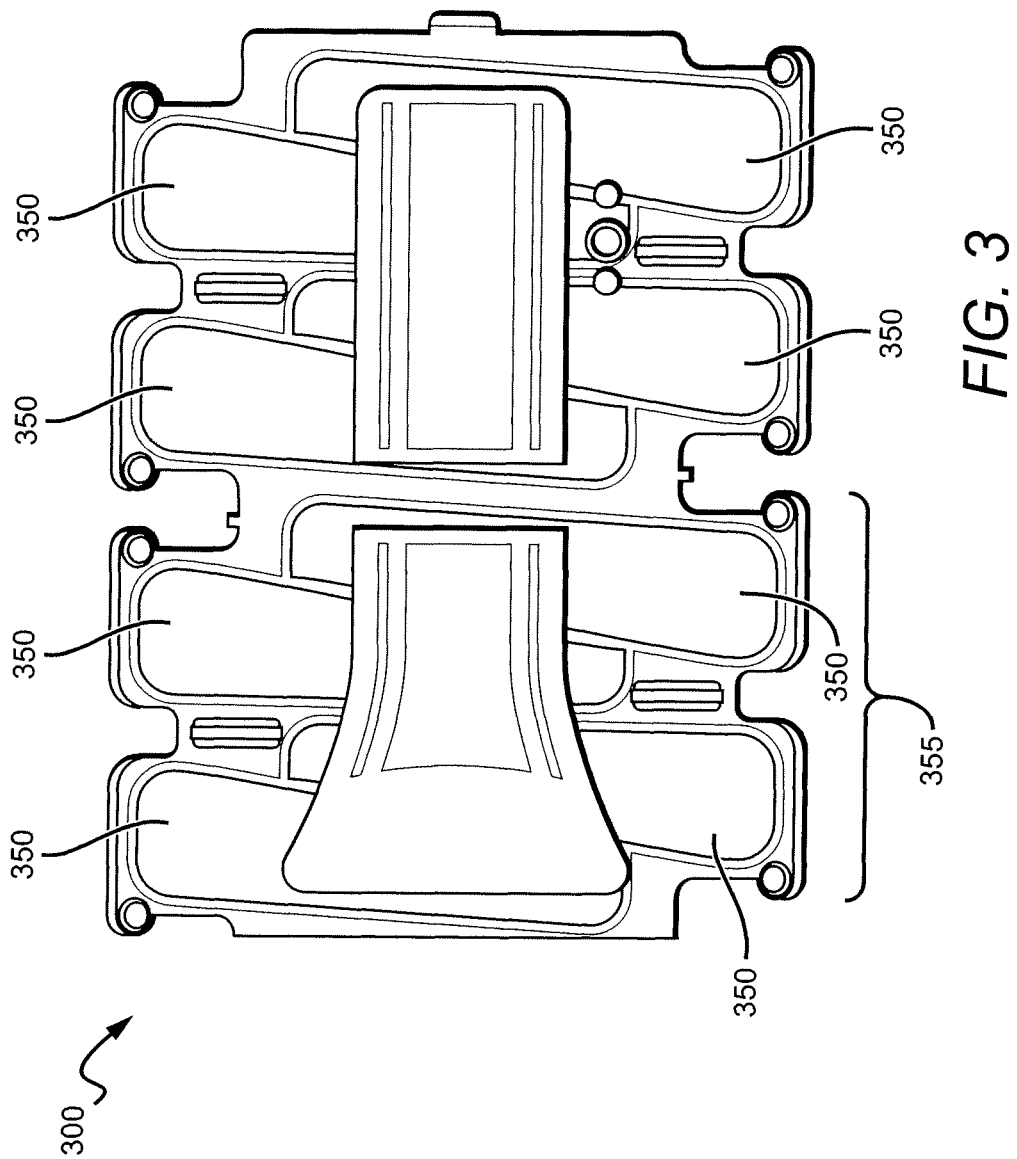
FIG. 3 shows a top view of a contemplated supercharger system 300, wherein the interlaced cross-runner pattern 355 of the intake runners 350 is clearly shown.

Contemplated supercharger systems also comprise a plurality of intake runners, wherein each runner of the plurality of intake runners is at least ten inches in length. In other embodiments, contemplated supercharger systems comprise a plurality of intake runners, wherein each runner of the plurality of intake runners is at least twelve inches in length. In yet other embodiments, contemplated supercharger systems comprise a plurality of intake runners, wherein each runner of the plurality of intake runners is at least fifteen inches in length. Just like in a normally aspirated intake manifold, long runners maximize low end torque. Packaging the supercharger down low in the valley of the engine and orienting the outlet of the supercharger upward allows for a long, smooth intake runner path with minimal bends. A contemplated supercharger system goes one step further and incorporates an interlaced cross-runner pattern resulting in a maximum runner length with no sharp bends. FIG. 3 shows a top view of a contemplated supercharger system 300, wherein the interlaced cross-runner pattern 355 of the intake runners 350 is clearly shown.

All of these contemplated design upgrades allow contemplated supercharger systems to overcome many of the disadvantages of conventional superchargers. For example, conventional supercharger systems mount the supercharger on top of the manifold and blow the air down toward the bottom of the engine, which means that the air has to make tight bends, in some instances a tight 180° turn upward and then another 180° turn back downward, before entering the vertical intake port. That conventional orientation also leaves little width for the intercooler down in the valley. Other systems have no defined runners at all, simply allowing each intake port to draw from the common plenum. This design drastically reduces the potential torque gains possible with the addition of the supercharger.

EXAMPLES

Example 1

The Edelbrock™ E-Force™ Supercharger System

The Edelbrock™ E-Force™ Supercharger System for the 2005-2009 4.6 L 3V Mustang utilizes Eaton's new Gen VI TVS Supercharger rotors, featuring a four lobe design with a full 160° degree of twist for maximum flow, minimum temperature rise, quiet operation. As mentioned earlier, this all-new design is engineered and manufactured by Edelbrock™—the same internals used on the new Corvette ZR-1. This combination improves 2005-2009 4.6 L 3-valve Mustangs to an impressive 466 horsepower and 439 ft/lbs of torque with very low boost (about five psi); this is more power per psi than any Mustang supercharger system on the market today.

The Edelbrock™ Supercharger is a complete system that maximizes efficiency and performance by minimizing air restriction into, and out of, the supercharger, which results in maximum airflow, with minimum temperature rise and minimum power consumption. In addition, Edelbrock™ inverted the supercharger and packaged it down low in the valley, allowing for an incredible, industry leading, 15 inches of runner length, maximizing low end torque. The supercharger housing itself is integrated into the intake manifold for a seamless design with minimal components, eliminating the possibility of vacuum leaks between gasket surfaces. The system also utilizes a front drive, front inlet configuration giving it the shortest, least restrictive inlet path on the market.

Further minimizing inlet restriction is the massive 85 mm electronic throttle body that is included in the kit at no additional cost. Sitting right above the supercharger and below the enormous runners is the largest air to water intercooler available, measuring an astonishing 110 square inches.

The E-Force™ supercharger is without a doubt the best looking engine compartment upgrade imaginable. It features a uniquely styled plenum, and includes matching side covers that hide the unsightly mess of wiring and hoses that Ford scattered all over the sides of the stock engine.

In summary, the Edelbrock™ supercharger will provide the most power at the lowest amount of boost resulting in excellent performance that is safe to operate on a completely stock engine. It is also "50 state emissions" legal and compliant.

Specifications:
  2300 cc/rev Twin Vortices (TVS) Rotor Group
  Low boost pressure for minimum stress on your stock engine
  More power per PSI of boost than any competitive kit
  Front drive, front inlet configuration for short intake path without use of a jack-shaft
  High capacity Air to Water Intercooler system with huge 110 in$^2$ intercooler, and dual core low temp radiator
  Enormous 15" long intake runners for maximum low end torque
  85 mm electronic throttle body
  Cast aluminum matching engine side covers
  Integrated bypass valve for little to no decrease in fuel economy
  Self contained oil system with 100,000 mile service interval (no drilling, no plumbing)
  High Flow Mass Air Flow Sensor (MAFS)
  High performance reusable air filter
  41 lb/hr fuel injectors
  0 heat range spark plugs
  Electronic PCM programming module, with application specific tuning
  Whisper quiet operation
  Black powder coat finish
  50 state emissions legal
  Available 3 year 36,000 mile warranty
  Bolt-on installation Thus, specific embodiments, methods of supercharger systems for motorized vehicles and related transportation have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

We claim:

1. A supercharger system contained within a housing, the supercharger system having a front end, a rear end, an inlet and an outlet and comprising:
   an integrated bypass valve,
   a rotor assembly, and
   a plurality of intake runners that comprise an interlaced cross-runner pattern, wherein the supercharger system comprises a front drive, front inlet configuration and wherein the plurality of intake runners are located under the rotor assembly.

2. The supercharger system of claim 1, wherein the rotor assembly is located in and installed from the rear end of the housing.

3. The supercharger system of claim 1, wherein the rotor assembly comprises at least two rotors.

4. The supercharger system of claim 3, wherein each rotor comprises at least two lobes.

5. The supercharger system of claim 4, wherein each lobe comprises at least 60° twist.

6. The supercharger system of claim 4, wherein each lobe comprises a 160° twist.

7. The supercharger system of claim 3, wherein each rotor comprises at least four lobes.

8. The supercharger system of claim 1, wherein the system further comprises an electric throttle body, an intercooler system or a combination thereof.

9. The supercharger system of claim 8, wherein the electric throttle body is at least 85 mm in diameter.

10. The supercharger system of claim 8, wherein the electric throttle body comprises at least one set of gears.

11. The supercharger system of claim 10, wherein the at least one set of gears are injection molded.

12. The supercharger system of claim 11, wherein the at least one set of gears comprises nylon.

13. The supercharger system of claim 10, wherein the at least one set of gears comprises glass-filled nylon.

14. The supercharger system of claim 8, wherein the intercooler system comprises at least 100 square inches of cooling area.

15. The supercharger system of claim 14, wherein the intercooler system comprises at least 110 square inches of cooling area.

16. The supercharger system of claim 1, wherein each runner of the plurality of intake runners is at least ten inches in length.

17. The supercharger system of claim 1, wherein each runner of the plurality of intake runners is at least twelve inches in length.

18. The supercharger system of claim 1, wherein each runner of the plurality of intake runners is at least fifteen inches in length.

19. A supercharger system contained within a housing, the supercharger system having a front end, a rear end, an inlet and an outlet and comprising:
- a rotor assembly,
- an integrated bypass valve,
- an intercooler system; and
- a plurality of intake runners that comprise an interlaced cross-runner pattern, wherein the supercharger system comprises a front drive, front inlet configuration and wherein the plurality of intake runners are located under the rotor assembly.

* * * * *